No. 793,622. PATENTED JUNE 27, 1905.
G. L. BOURNE.
HYDROCARBON FURNACE.
APPLICATION FILED NOV. 27, 1903.

3 SHEETS—SHEET 1.

Witnesses:
H. S. Gaither
Paul Schmuckel

Inventor:
George L. Bourne
by Wm. T. Belt
Attorney

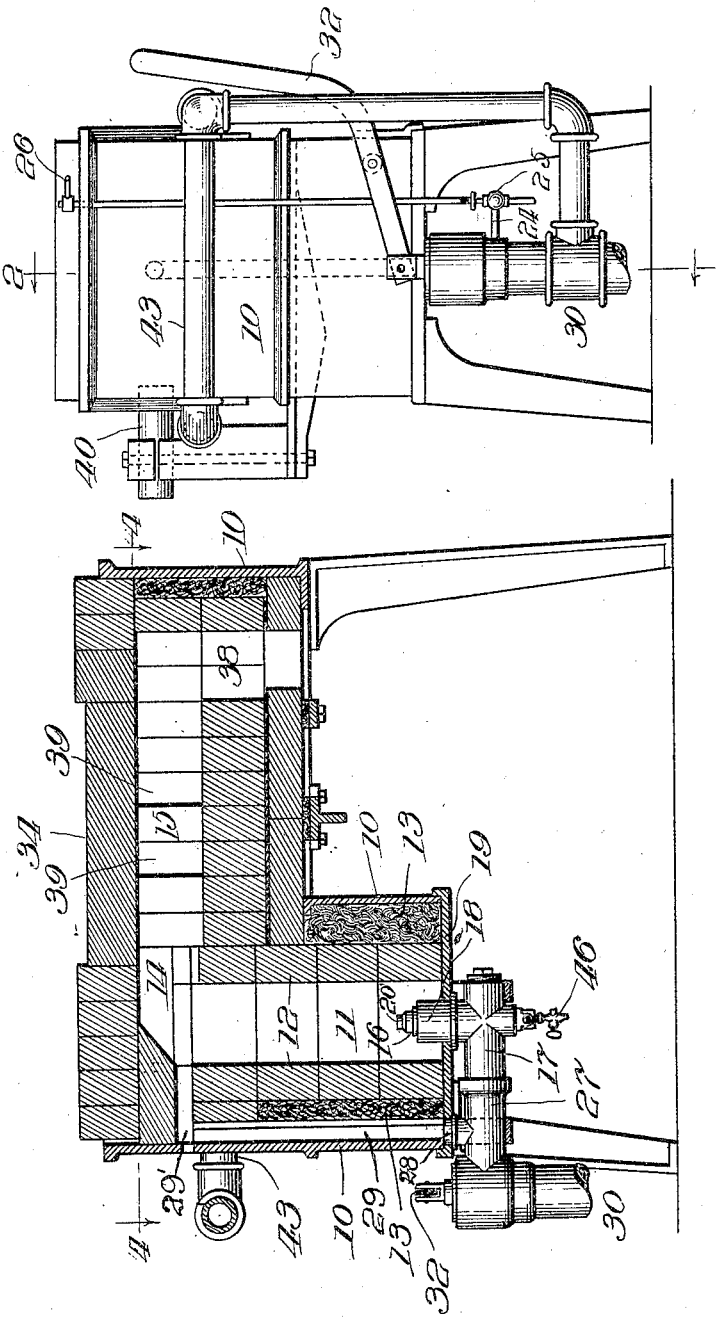

No. 793,622. PATENTED JUNE 27, 1905.
G. L. BOURNE.
HYDROCARBON FURNACE.
APPLICATION FILED NOV. 27, 1903.

3 SHEETS—SHEET 3.

No. 793,622.

Patented June 27, 1905.

UNITED STATES PATENT OFFICE.

GEORGE L. BOURNE, OF CHICAGO, ILLINOIS, ASSIGNOR TO THE RAILWAY MATERIALS COMPANY, OF CHICAGO, ILLINOIS, A CORPORATION OF ILLINOIS.

HYDROCARBON-FURNACE.

SPECIFICATION forming part of Letters Patent No. 793,622, dated June 27, 1905.

Original application filed November 17, 1902, Serial No. 131,705. Divided and this application filed November 27, 1903. Serial No. 182,876.

*To all whom it may concern:*

Be it known that I, GEORGE L. BOURNE, a citizen of the United States, residing at Chicago, in the county of Cook and State of Illinois, have invented certain new and useful Improvements in Hydrocarbon-Furnaces, of which the following is a specification.

This application is a division of my application, Serial No. 131,705, filed November 17, 1902.

The invention relates to novel improvements in furnaces of the class in which crude petroleum or fuel-oil is employed as a fuel; and its object is to provide an economical and serviceable furnace of comparatively small size when required and promote the efficiency of this class of furnaces by producing a perfect combustion of the fuel, and thus secure the benefit of all the heat units contained therein. This result is obtained primarily by volatilizing and converting oil into a complete gaseous state in a primary combustion-chamber and then introducing a blast of fresh air to supply the necessary additional oxygen to provide a perfect combustion in a secondary combustion-chamber, so that a high degree of perfect heat, free from uncombined carbon or oxygen, will be obtained in the heating-chamber, located, preferably, adjacent to the secondary combustion-chamber.

The particular feature of the invention which forms the subject-matter of this application consists of the novel means for supplying the air and oil in sufficient and proper volumes to accomplish the desired results heretofore mentioned.

To explain the invention, I have chosen to illustrate it as embodied in a furnace for welding flues.

Figure 1:
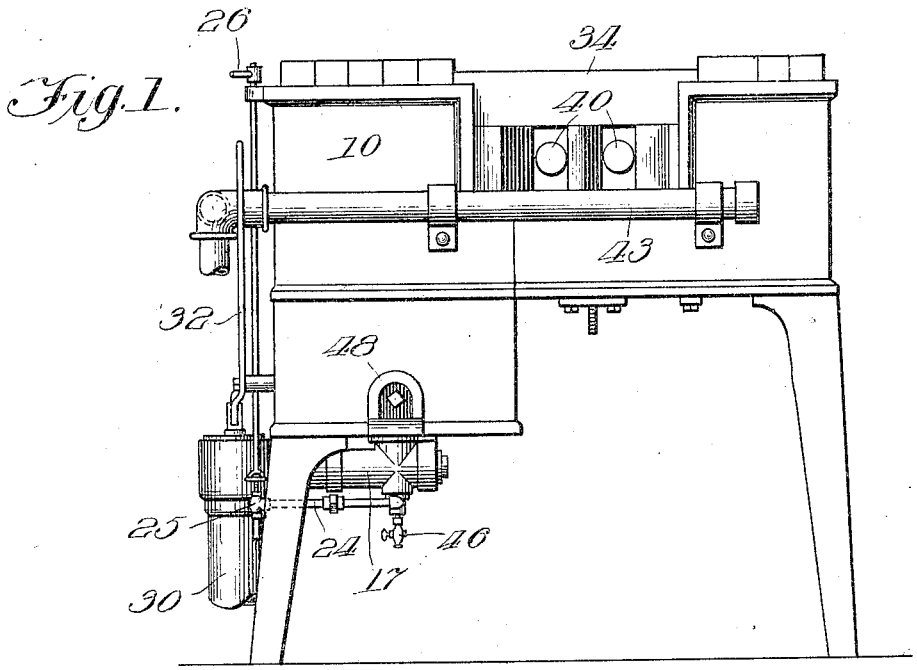
Figure 4:
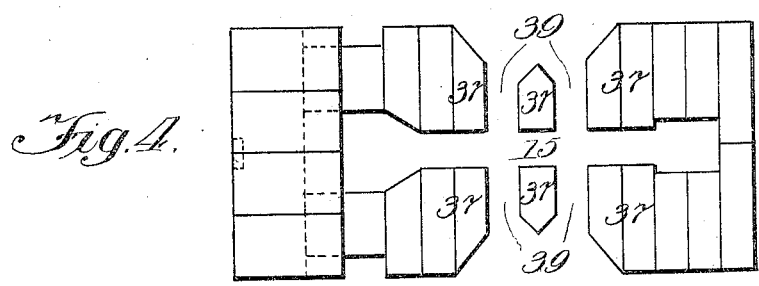
Figure 5:
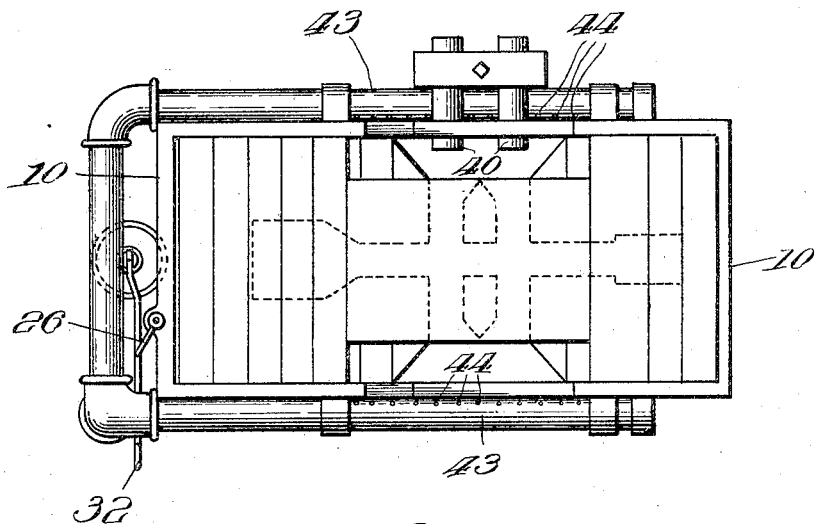
Figure 6:
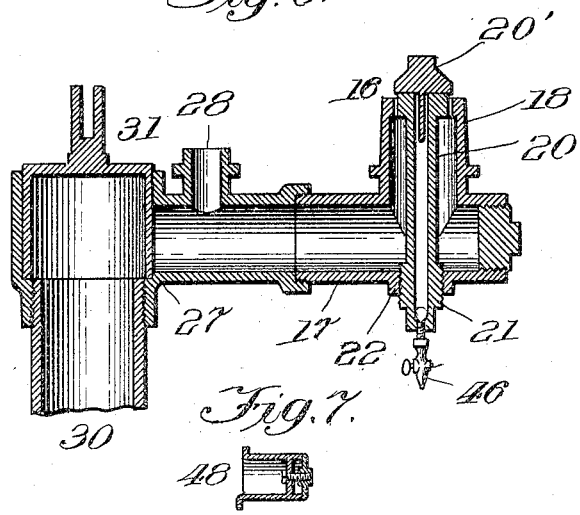
Figure 7:

Referring to the drawings, Figure 1 shows the furnace in elevation. Fig. 2 is a sectional view on the line 2 2 of Fig. 3. Fig. 3 is an end view. Fig. 4 is a diagrammatic view on the line 4 4 of Fig. 2. Fig. 5 is a top plan view. Fig. 6 is a sectional view of the air-valve and burner connections. Fig. 7 is a sectional view of the plug-closure for the lighting-opening.

In the drawings like numerals of reference indicate corresponding parts in the several figures, and, referring thereto, 10 is the exterior casing, and 11 is a vertical primary combustion-chamber walled up with fire-brick 12, which are partly surrounded by a non-combustible packing 13. The primary combustion-chamber communicates with a secondary combustion-chamber 14, which in turn communicates with the heating-chamber 15.

The burner 16, Figs. 2, 6, comprises a burner connection 17, provided with an upward extension 18, which projects through the bottom 19 of the furnace into the primary combustion-chamber. An oil-tube 20 is arranged in said extension and is provided with a threaded collar 21 near its bottom, which is screwed into the threaded wall 22 of an aperture in the bottom of the burner connection. A valve 20' at the upper end of the oil-tube is adapted to be raised by the pressure of the oil, and a space is left around the tube between itself and the extension 23 to permit the escape of air from the air-pipe. The oil-tube is connected at its lower end with a supply-pipe 24, provided with a valve 25, adapted to be operated by a lever 26.

The air-valve connection 27 is connected in line with the burner connection and is provided with an outlet 28, communicating with a flue 29, which turns inward at 29' to discharge a quantity of fresh air into the gases resulting from the primary combustion and provide the necessary oxygen for a perfect combustion of the fuel in the secondary combustion-chamber. An air-pipe 30 connects with this air-valve connection at one end thereof and at right angles thereto and is provided with a valve 31, which is operated by a lever 32, fulcrumed on the side of the furnace, Fig. 3.

The heating-chamber may have a solid top 34 and an opening 38 in the bottom, and a heating-chamber for a furnace of this type has two or more transverse passages 39 to accommodate the flues. I may also provide a stop 40 on a support 42, against which the flue can be held while being heated, and to protect the operator from the heat which may escape from the furnace I may provide air-pipes 43, connected with the air-pipe 30 and having a series of openings 44 to discharge jets of air opposite the passages 39. A valve 46 permits the oil-tube to be drained when necessary.

The importance of this invention lies particularly in the manner of distributing the air to the flue and burner to facilitate a thorough primary volatilization of the oil and a perfect secondary combustion, whereby the very best results are obtained. The oil may be fed by gravity or under pressure, and in either case it is adapted when the valve 25 is opened to raise the valve 20' by its own pressure and ooze out laterally at the top of the oil-tube. The burner may then be lighted by first removing the plug 48 and inserting a torch. The valve 20' is made somewhat larger than the top of the oil-tube, as it projects partly beyond the periphery of the tube and over the air-space between the tube and the extension 18. A cold-air blast is furnished by a suitable fan, (not shown,) and when the valve 31 is opened air will pass through the extension 18 and strike the oil oozing out beneath the valve 20', being slightly retarded by engaging the projecting face of said valve and allowing volatilization to take place at once at the burner. Fresh air is introduced from the air-flue to provide for perfect combustion in the secondary combustion-chamber, which produces a dry welding heat in the furnace selected for illustration, which passes directly into the heating-chamber 15. It will be observed that the secondary combustion-chamber in which perfect combustion takes place is located in the angle between the vertical primary combustion-chamber and the horizontal heating-chamber and that the furnace can therefore be confined to comparatively small proportions without restricting its uses or capacity.

The arrangement of the air-supply pipe communicating first with the air-flue and then with the burner is important, as it provides for distributing the air to accomplish the most satisfactory results. By this construction the flue being located close to the valve 31 receives the greater body of the blast and at its highest velocity, while the proper quantity of air for the primary combustion is discharged into the primary combustion-chamber at a considerably reduced velocity, so that volatilization may take place as close to the burner as possible. The primary gases will then travel slowly up through the primary combustion-chamber and the primary combustion will be completely accomplished before the secondary combustion-chamber is reached, in which all particles of oil are entirely consumed and the dry gases are driven into the heating-chamber.

I consider it desirable to have the connections 27 and 17, which really constitute the horizontal extension of the air-pipe, connected at a right angle with the vertical main supply-pipe 30 and locate the air-valve in the angle thus formed. As the flue is connected to the upper side of the air-pipe extension close to the air-valve, it will be observed that the blast of air issuing from the main pipe will be partly directed at a very slight angle into the flue and partly directed to the burner with two turns, which materially reduce the velocity and supply the quantity of air desired for the burner. In this way I provide for supplying the necessary quantity of air to enable volatilization at the burner and the production of a dry welding heat in the heating-chamber.

Practical experience has demonstrated that a welding heat of perfect character may be obtained in this furnace in a very few minutes, and the superior results obtained are due in a large measure to the fact that the combustion takes place at the burner and the oil which is not consumed is volatilized and wholly converted into a gaseous state before it passes to the secondary combustion-chamber, where the admission of additional air provides for a complete and perfect combustion. The heated gases pass directly from the secondary combustion-chamber into the heating-chamber without danger of the material suffering from oxidation or wasting or scaling because of the entire absence of uncombined carbon or oxygen. The primary combustion-chamber is preferably made to all intents and purposes air-tight, so that the quantity of air introduced therein may be regulated by the valve 31 and controlled by the operator in proper proportion to the quantity of oil, and by the novel arrangement of the air-pipe with relation to the flue and burner the proportions of air delivered to the flue and to the burner are constantly maintained.

Without limiting myself to the exact construction and arrangement of parts herein shown and described, what I claim, and desire to secure by Letters Patent, is—

1. A furnace comprising a primary combustion-chamber, a secondary combustion-chamber, a vertically-arranged main air-pipe provided at the top thereof with a horizontal extension beneath said chambers, an air-flue connected with the secondary combustion-chamber and to the upper side of said extension close to the main pipe so that a part of the air will enter said flue from the pipe at or about its maximum velocity, and a burner in the bottom of the primary combustion-chamber connected to said extension at the outer end thereof.

2. A furnace comprising a primary combustion-chamber, a secondary combustion-chamber, a vertically-arranged main air-pipe at the side of the furnace provided with a horizontal extension beneath said primary combustion-chamber, an air-flue connected with the secondary combustion-chamber and to the upper side of said extension close to the main air-pipe, a burner in the bottom of the primary combustion-chamber and connected to said extension, and an air-valve located in the angle formed by the connection of said extension with the main air-pipe.

GEORGE L. BOURNE.

Witnesses:
MINNIE WOODLE,
P. M. ELLIOTT.